United States Patent [19]

Barrett et al.

[11] Patent Number: 5,214,761
[45] Date of Patent: May 25, 1993

[54] REAL-TIME ADJUSTABLE-TRANSFORM DEVICE DRIVER FOR PHYSICAL DEVICES

[75] Inventors: David M. Barrett, Tyngsboro, Mass.; Kenneth C. Knowlton, Merrimack, N.H.

[73] Assignee: Wang Laboratories, Inc., Lowell, Mass.

[21] Appl. No.: 794,354

[22] Filed: Nov. 12, 1991

Related U.S. Application Data

[63] Continuation of Ser. No. 348,636, May 8, 1989.

[51] Int. Cl.⁵ .................. G06F 3/023; G06F 13/00
[52] U.S. Cl. .................. 395/275; 395/375; 364/260.4; 364/260.1; 364/951.1; 364/DIG. 1
[58] Field of Search .......... 364/200, 239.3, 260, 364/260.1, 260.3, 260.4, 260.9, 900, 920.7, 939.2, 95.1; 395/275, 375

[56] References Cited

U.S. PATENT DOCUMENTS

| 3,654,617 | 4/1972 | Irwin | 364/200 |
|---|---|---|---|
| 3,800,290 | 3/1974 | Croxon | 364/200 |
| 3,950,735 | 4/1976 | Patel | 364/200 |
| 4,058,849 | 11/1977 | Fitzgerald et al. | 364/900 |
| 4,128,876 | 12/1978 | Ames et al. | 364/200 |
| 4,138,718 | 2/1979 | Toke et al. | 364/200 |
| 4,246,637 | 1/1981 | Brown et al. | 364/200 |
| 4,701,879 | 10/1987 | Akai et al. | 364/200 |
| 4,714,929 | 12/1987 | Davidson | 364/724.1 |
| 4,716,542 | 12/1987 | Peltz et al. | 364/900 |
| 4,789,953 | 12/1988 | Gerrath | 364/724.01 |
| 4,802,109 | 1/1989 | Machida | 364/723 |
| 4,817,025 | 3/1989 | Asai et al. | 364/724.01 |
| 4,895,431 | 1/1990 | Tsujiuchi et al. | 364/822 |
| 4,908,787 | 3/1990 | Dyer | 364/724.01 |
| 4,949,725 | 9/1990 | Raviv et al. | 128/731 |
| 4,985,848 | 1/1991 | Pfeiffer et al. | 364/518 |
| 5,056,008 | 10/1991 | Ono | 395/375 |
| 5,097,410 | 3/1992 | Hester et al. | 395/275 |
| 5,115,510 | 5/1992 | Okamoto et al | 395/775 |

FOREIGN PATENT DOCUMENTS 0188059 7/1986 European Pat. Off. .

*Primary Examiner*—Dale M. Shaw
*Assistant Examiner*—Diane E. Smith
*Attorney, Agent, or Firm*—Kenneth L. Milik

[57] ABSTRACT

A device driver in a computer system being controlled by an application program has selectable algorithms for making desired changes to the signals produced by an external device. The signal changes are in addition to any changes which are needed for conforming the external device signals into a data structure required by the application. Selectable algorithms include a data filtering capability as well as a procedure to enhance the data produced by the external device.

25 Claims, 2 Drawing Sheets

REAL-TIME ADJUSTABLE-TRANSFORM DEVICE DRIVER FOR PHYSICAL DEVICES

This is a continuation of co-pending application Ser. No. 07/348,636 filed on May 8, 1989.

BACKGROUND OF THE INVENTION

The present invention relates to computers, and more particularly to device drivers which provide interface services between a computer and its external devices.

Conventional microprocessor based machines known as personal computers (PC), typically include external devices such as a cathode ray tube (CRT) display, keyboard, tablet, mouse and a printer for generating or receiving various data which are passed into or out of the PC. In the case where signals are generated by a user manipulating one or more of the external devices, such signals represent data that must be changed into a form suitable for an application program which is operating in the computer and which needs to receive that data. Conversely, any data produced by the application program must also be changed into suitable form before such data can be used by one of the external devices.

Usually containing many lines of code, application programs typically include device drivers which are relatively small programs for controlling and interfacing with external devices. Device drivers provide data structuring ability so that the application program and the external devices can communicate with one another. There is one device driver for each external device which will have access to or be accessed by the application program. This arrangement thus permits great flexibility to accommodate any differences between one particular external device and another. For example, coordinate pointing devices such as a mouse, joystick and a tablet can each be used so long as the three respective device drivers can be loaded into the application program. Moreover, devices of the same type but which have different operating characteristics, can each be accommodated.

With the rise in popularity of computer applications which require graphical inputs, the conventional digitizing tablet is often used as an external device. As can be appreciated, there are now many tablet devices available which has resulted in a correspondingly large number of tablet device drivers to accommodate the variety of commercial offerings and graphical input capabilities.

A problem has arisen if additional data processing is desired for inputs which may contain unwanted noise or if some special data handling is needed for an individual user. For example, a handicapped user may have trouble creating smooth straight or curved lines on a tablet. Since application programs contain relatively large amounts of code, changes may be difficult and thus costly to implement. Although device drivers contain relatively small amounts of code, each of the proliferation must be rewritten to accommodate the special changes. Again, making changes require much effort and attendant cost.

SUMMARY OF THE INVENTION

The above-mentioned problems and disadvantages of the prior art arrangements are overcome by the provision of a new and improved device driver made in accordance with the teachings of the present invention. In a preferred embodiment, the present invention is capable of incorporating a transform which a user selects from a prescribed group of transforms. Each of the transforms have data manipulating abilities beyond the capabilities of prior art device drivers which translate the data structure of external device signals so that they can be recognized by the application program coupled to receive those signals. This arrangement also permits the user to make coarse and fine adjustments to the external device signals. The coarse adjustment is the result of the user making a specific transform selection from the group. The fine adjustment is the result of the user defining the value of one or more variables which control the behavior of the selected transform itself. As further explanation, if the selected transform is a noise filter, the transform itself determines what type of noise is removed while a variable in that transform can be used to control how much noise is to be removed.

When the device driver of the present invention is first loaded for use with an application program, a command line parameter is preferably supplied enabling the user to make a selection of which transform from the group is to be incorporated. Other command line parameters are available for specifying the initial settings of an variable used within the selected transform.

The present invention provides services to both the application and to the transforms. The application services include enabling and disabling device driver output, programming the report rate of the tablet, reinitializing the hardware, and defining the value of the transform variable as desired by the user. Some of the transform services include the provision of an interface for passing data from the transform to the application, provision of an error handling routine and provision of an end of-interrupt routine.

In a working embodiment of the present invention, four data-transforming algorithms have been implemented for selection by the user. One is transparent, two are data filtering, and the fourth is data enhancing. The transparent algorithm enables the present invention to operate as a prior art device driver so that external devices can communicate to the application program. One of the two filtering algorithms acts for making the application program less sensitive to certain inputs representing motions of the external device. The other data filtering algorithm and the data enhancing algorithm are both useful of making curved motions of the external device look relatively smoother.

As a result, the present invention permits a handicapped user to draw straight and curved lines on a tablet sued in connection with a graphical application program.

BRIEF DESCRIPTION OF THE DRAWINGS

The various features of the present invention may be more fully understood from the following description when read together with the accompanying drawings in which.

DESCRIPTION OF THE PREFERRED EMBODIMENTS

It should be understood that an actual working embodiment of a device driver made in accordance with the teachings of the present invention has been implemented on a PC which is compatible with an IBM PC AT model personal computer. One of the preferred external devices is a conventional digitizing tablet, such as but not limited to the MM1201, MM 961 and CR1212 tablets made by Summagraphic, which uses the RS 232 serial interface port of a PC. The device driver code was first written using 80×86 Assembler Code and is included as Appendices A and B, which are included in this patent specification. For ease of presentation and understanding, the preferred embodiment of the present invention will be described with respect to the working embodiment. However, it is understood that the present invention is not to be limited to the teachings of the working embodiment.

Figure 1:
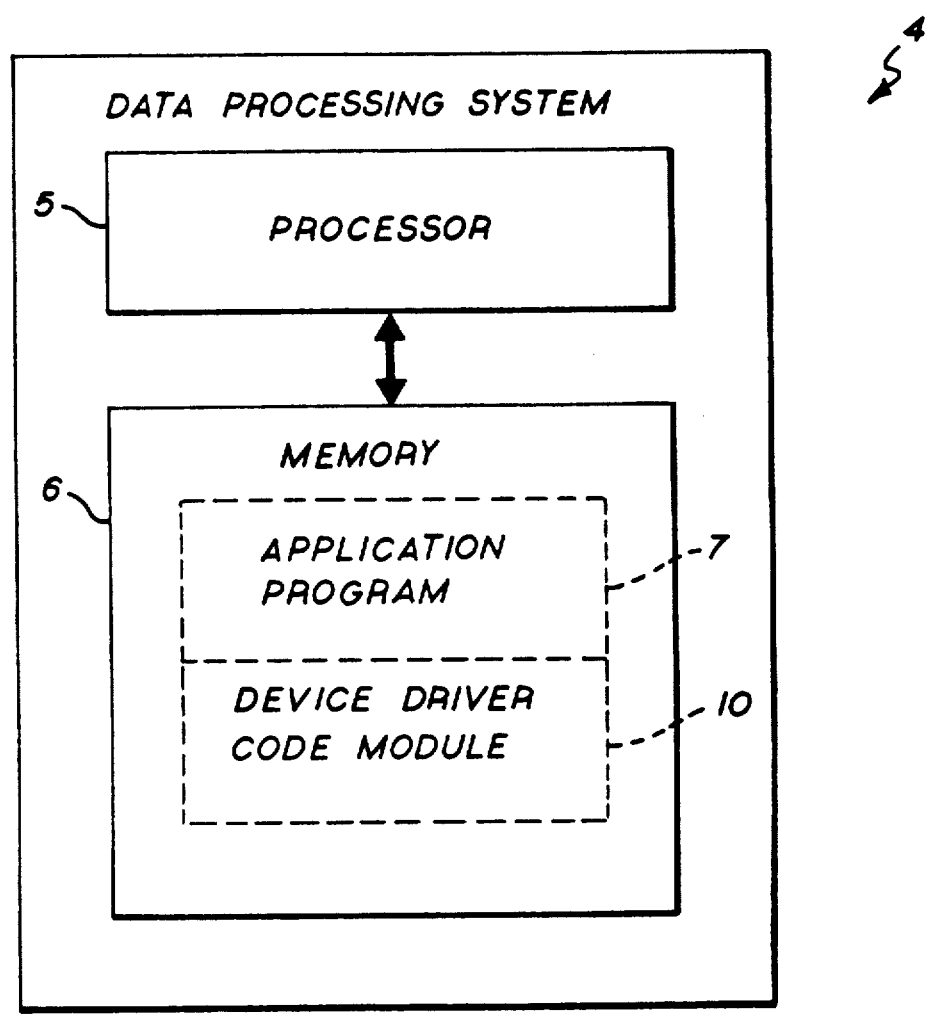
FIG. 1 illustrates an overflow block diagram of the data processing system of the present invention.

Depicted in FIG. 1 is an overview block diagram of a data processing 4 which embodies the present invention. The data processing system 4 includes a processor 5 and a memory 6 interconnected by means of a memory bus. The memory 6 is shown to include an application program 7 and a device driver code module 10.

Figure 2:
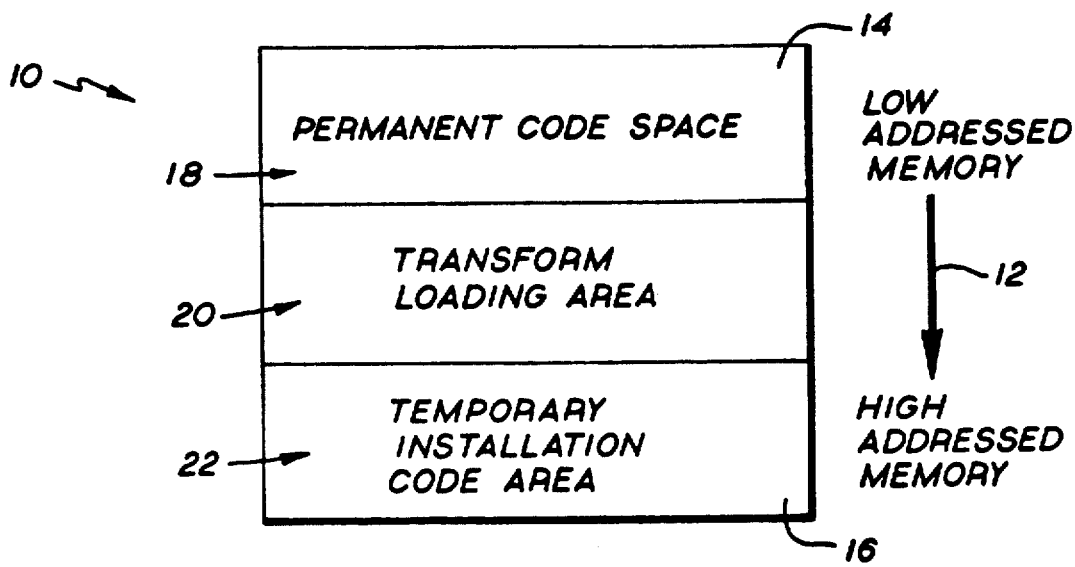
FIG. 2 depicts a memory map of a device driver made in accordance with the teachings of the present invention.
Figure 3:
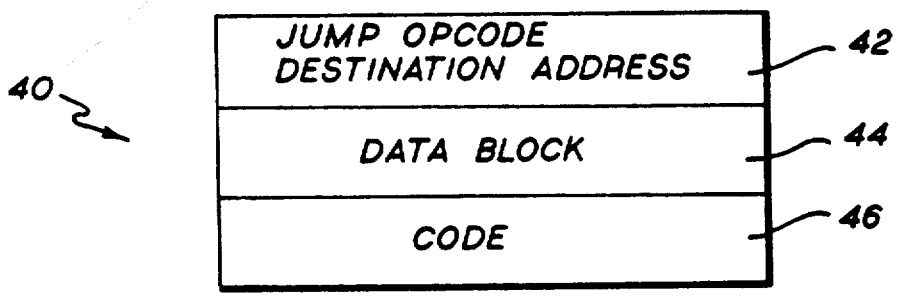
FIG. 3 shows the general structure of a data transforming algorithm used in the present invention.

Depicted in FIG. 2 is a memory map of one embodiment of the device driver 10 made in accordance with the teachings of the present invention. An arrow 12 shows the direction of increasing memory addresses. The low addressed memory is at address 14 and the high addressed memory is at address 16. A permanent code space 18 contains the code used by the device driver 10 during system execution. In the code space 18 are instructions such as the interrupt service routine and the device driver enabling and disabling procedures.

A transform loading area 20 is a section of empty memory located within the device driver 10. Starting with the lowest available memory address, a user selected data transforming algorithm, which is known as the transform, is read into this area. The size of the area is initially set to be at least equal to the size of the largest expected transform.

The device driver 10 of the present invention preferably contains four data transforming algorithms. Two are filtering algorithms that remove unwanted noise which may be present in the data generated by either the tablet or human operator. The other two algorithms provided data enhancement. These four algorithms will be described in more detail in a later portion of the this discussion.

When the device driver 10 is being loaded, a user (computer operator) makes a selection of a command line parameter that specifies which data transforming algorithm (transform) is to be used. This parameter is a text string that contains the file and path name of the file containing the chosen algorithm. Other command line parameters are available for specifying initial setting of any other variable if such is needed by the transform.

The last section of the device driver is a temporary installation code area 22. The code in this area initializes the data structures used by the device driver 10, initializes the hardware managed by the device driver, loads the transform into the transform loading area 20, takes over the necessary interrupt vectors, and performs error checking on all device drive parameters supplied by the user.

After being loaded, the first action taken by the device driver is to initialize itself and the hardware it manages. Thus, it programs the serial port, redirects the serial port interrupt vector to point to its interrupt handler routine, and loads the user selected transform. The transform is loaded by reading an executable binary image from the file specified on the command line. The image is read into the blank transform loading area 20 located within the program code of the device driver 10.

After the initialization has been successfully completed, the code in the area 22 then proceeds to return to the operating system any memory that is not needed by the device driver 10. The memory that is returned starts immediately after the transform and includes any unused memory in both the transform loading area 20 and the temporary installation code area 22.

As previously mentioned, the present invention preferably contains four data transforming algorithms which are each located within its own file. In the working embodiment of the present invention, the files are recorded on a hard disk in an area separated from the device driver code. The selected file is retrieved as needed. This arrangement also allows easy distribution of any subsequently developed transforms since new device drive code is not required every time a new transformed is created.

Depicted in FIG. 2 is a diagram showing the general structure of a transform 40 that is used by the device driver of FIG. 1. Having three major components, the transform 40 is divided into a gateway 42, a data block 44 and a code 46. Since the separately stored algorithms are dynamically relocatable upon user selection, the address references within each algorithm are with respect to the address where that algorithm begins. The gateway 42 is provided in a fixed location which is communicated to the device driver 10 so that only the selected algorithm is executed and not all four algorithms. The gateway arrangement permits each algorithm to have multiple entry points.

In the aforementioned working embodiment of the present invention, the gateway 42 is the first three bytes of each algorithm and is actually a jump instruction. The first byte is a jump opcode and the other two form the destination address relative to the beginning of that algorithm. The device driver transfers control to the algorithm by jumping to this jump instruction. Since the addresses within the gateway 42 are only associated with the selected algorithm, the transform 40 contains information for controlling which entry point is to be accessed. The information to be loaded in the gateway 42 is determined when the user makes a selection of the command line parameter.

The data block 44 contains information for obtaining the length of the chosen algorithm, the upper and lower limits for the value of any variable used in that algorithm, and a variable space for the magnitude of the variable itself. In addition, there is space for the addresses of the device driver routines that handle errors and pass data to the application. There is also space for the addresses of two buffers. The first buffer is for raw data from the external device and the second is for data that is transformed in accordance with the selected algorithm and is to be sent to the application.

The first word of the data block 44 is the length of the entire algorithm in bytes. With reference back to FIG. 2, this information is used by the installation code in the code area 22 for determining the memory addresses of unused memory locations after the selected algorithm is loaded into the transform loading area 20. In the working embodiment, this first word is 16 bits long so that no more 65535 bytes is available for the longest data transforming algorithm.

The next two words define the range of values that the transform variable may assume. The lower bound is specified first, followed by the upper bound. The transform supplies these values so that the device driver can validate the transform variable specified by the user. The transform variable is validated when the device driver is loaded and a new value of the variable is specified through the device driver application services.

In order to permit relatively easy development of new transforms, the device driver provides three transform services. The first passes date to the application. The second is an error handling routine that reinitializes the hardware. The third service simply provides the transform with an end of interrupt routine. All of these services return control to the device driver and cause the execution of the interrupt handler to be terminated. The three words that follow the data relating to the bounds of the transform variable are the addresses of these services relative to the start address of the device driver. The device driver initializes these words when it loads the transform.

A pair of buffers are provided so that data can be passed to and from the transform. The data block at the beginning of each transform contains a pair of words that specify the addresses of the buffers. The first buffer is the input buffer. The device driver receives data from the hardware and places it into this buffer before jumping to the transform. The second buffer is the output buffer where the transform places data that is ready to be sent to the application.

Also included in the data block is storage space for the transform variable. When the device driver is loade, it fills this storage space with the value of this variable specified by the user. The user can change this value dynamically after the device driver is loaded through a service provided by the device driver.

Any environmental information needed by the transform is also passed to it through the data block. This arrangement is useful because there are some conditions, such as system idle periods, where it is undesirable for the transform to add points to the data stream. A variable is used by the device driver to notify the transform when these conditions exist.

The transform code 46 is located after the data block 44. This is the code that implements the data filtering or enhancing features of the present invention. The code 46 is actually in the form of a finite state machine (FSM). Giving the transform the structure of an FSM increases the amount of processor bandwidth available to the computer. As further explanation, the data from an external device such as a digitizing tablet is in the form of a five byte packet. These bytes enter the system through the serial ports, each one causing an interrupt. By using a small amount of processor bandwidth each time a byte arrives, the transform receives more bandwidth than it would otherwise receive if it was not called until the entire packet was available. Furthermore, since the bandwidth used by the transform is distributed over time, the computer system is less affected by its loss.

Thus when an interrupt occurs indicating that a byte of tablet data has arrived, the device driver takes the data and puts it into the input buffer. The device driver then enters one of the states of the transform by jumping through the transform gateway. The jump address of the gateway determines which state of the transform is entered. The entered state then takes the data from the input buffer, performs its function and stores any partial results, and updates the gateway jump address to be that of the next state to be executed. Control is then returned to the device driver through one of the three provided transform services.

In the actual working embodiment of the present invention, four transforms have been implemented. As will be described below, one is transparent, two are data filtering, and the last is data enhancing. The transparent transform simply operates to collect data until an entire packet has been accumulated. The device driver is then directed to deliver the packet to the application. With this transform being used in to the present invention, the device driver operates in the same manner as a prior art device driver.

The second transform, called the four point averaging transform, collects coordinate pairs (each complete data packet being defined as a pair of coordinates representing position information)) from the tablet and averages them together to produce a single coordinate pair which is subsequently transmitted to the application. This transform operates to smooth the data (especially data representing curve information) and acts as a noise filter. Since only one coordinate pair is used by the application for every four pairs generated by the tablet, this transform also reduces the amount of data used by the application.

Known as the X-percent of the Way There Algorithm, the third transform operates to calculate the distance between two coordinate pairs generated by the tablet. It then determines a replacement pair of coordinates which are at a distance that is X percent of the calculated distance. The replacement pair of coordinates are later transmitted to the application. Unlike the previously described transform, this one is not data reducing since a coordinate pair is produced for every pair generated by the tablet. The transform variable is the X-percent variable.

Figure 4:
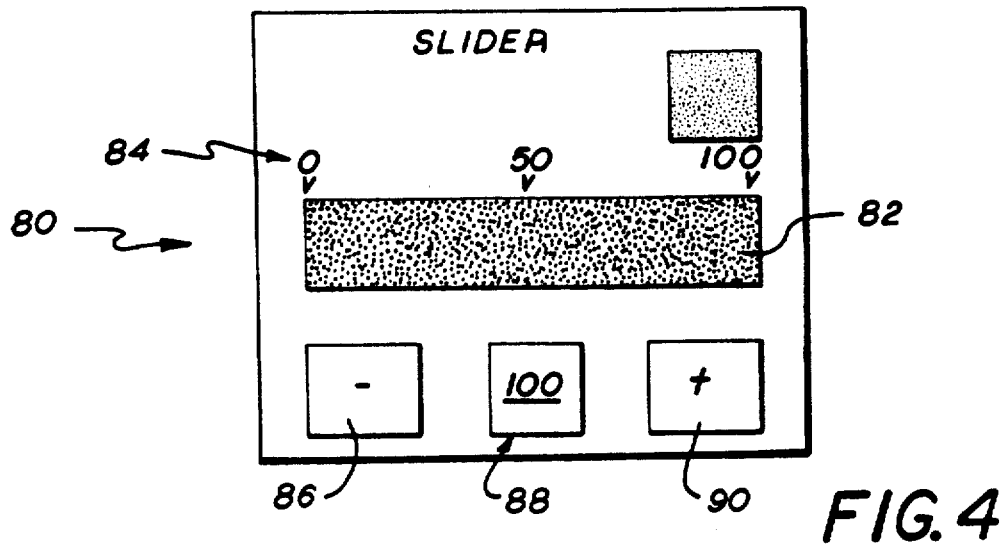
FIG. 4 presents a slider used for changing the value of a transform variable.

In the working embodiment, a separate program (first written in the C program language) is evoked by the user for setting the actual value of this transform variable. Presented in FIG. 4 is a slider 80 having a horizontal bar 82 which shows the present value of the transform variable v (which is the X-percent variable of the transform) to be 100, representing 100 percent. The scale 84 above the horizontal bar 82 is shown with a range of values between zero percent and 100 percent. The value of transform variable v is also displayed in region 88. By locating a CRT display cursor (under the control of a tablet) within minus region 86 and causing an activation by a user action recognized by the separate program, the horizontal bar 82 will move left thereby decreasing in value. Then by deactivating minus region 86 via an appropriate action by the user the movement of the bar 82 will cease and stop at a value. The value of the transform variable v is thus fixed at the new value which is displayed in region 88. Similarly, by activating plus region 90, the horizontal bar 82 will move towards the right and the value of the transform variable v shown in region 88 increases until a deactivation action is recognized by the separate program. In the working embodiment, the range of zero to 100 percent is actually corresponds to a range from one to 99 percent respectively. This arrangement avoids zero as a value for the X-percent which would result in no data being sent to the application. This transform is particularly useful with the invention recited in the United States application having Ser. No. 108,176, filed on Oct. 14, 1987, and assigned to the same Assignee as the present invention.

The third transform, called the Pseudo B-Spline transform, operates to produce three coordinate pairs for use by the application. The three pairs are derived from each coordinate pair generated by the tablet. This algorithm keeps in a buffer a historical record of not only the last three coordinate points, designated as A, B and C, produced by the tablet, but also the next coordinate point, designated as D. It should be explained that a coordinate point is a pair of values which represent a position in a suitable planar coordinate system, such as the x y coordinates of a Cartesian plane. When the new point D is received additional points B' and B'' are calculated in accordance with the respective equations given below:

$$B' = [-2A + 17B + 7C - D]/21$$

$$B'' = [-A = 7B = 17C - 2D]/21$$

Points B, B' and B'' are sent to the application and the buffer containing points A, B and C is rolled backwards so that point B becomes A, point C becomes point B and point D becomes C. The purpose of this algorithm is to make more smooth the curve which is apparently produced if all originally generated points were joined with straight lines. This transform is based on well known and conventional algorithms called B Spline techniques. However, it is clear that any other desired routine can be implemented as desired for generating extra points.

While the invention has been described with reference to specific embodiments, it will be apparent that improvements and modifications may be made within the purview of the invention without departing from the spirit and scope thereof as defined in the appended claims. For example, even though a RS-232 serial port is used as the interface with the external device, a parallel or other proprietary interface can be utilized. Moreover, the tablet pointing device can also be replaced by a touch screen CRT.

In the aforementioned working embodiment, the device driver must be specified when the driver is first loaded for use with a particular application. A new device driver service can be added that would allow users to dynamically change transforms in a manner similar to the way the transform variable is changed in the X-percent of the Way transform.

The present embodiments are thus to be considered in all respects as illustrative and not restrictive, the scope of the invention being indicated by the appended claims rather than by the foregoing description, and all changes which come within the meaning and range of equivalency of the claims are therefore intended to be embraced therein.

```
;****************************************************************
;
;              SHL.ASM
;
;              Driver for Cheap Tablet.  Supports State Machines
;
;
;****************************************************************

;Original creation - adapted from WTI1212D.ASM            08/03/88 dmb
;Modified for use with state machines                     02/24/89 cdm
;Shrunk down to size                                      04/05/89 cdm ;MUST NOT BE LINKED WITH /DOSSEG
;MUST USE /NOD LINKER OPTION
;MUST BE LAST FILE IN OBJECT LIST ;include the memory model macros
INCLUDE \bs\model.mac
;+++INCLUDE \include\model.mac SPL_POINT       STRUC
spl_header      db      0
x_coord         dw      0
y_coord         dw      0
unused          db      0
SPL_POINT       ENDS
```

```
TAB_ENTRY        STRUC
start_addr       dw       0
state_len        dw       0
var_rngl         dw       0
var_rngh         dw       0
TAB_ENTRY        ENDS .286p
                 public   _WT_Install,_WT_Enable,_WT_Disable,_WT_Remove
                 public   WT_Interrupt,_WT_Init
                 public   WT_BaseAddr,out_pnt
                 public   copyint
                 public   tab_speed,state_varflg,state_var
                 public   machine_table ;state variables of the module
                 extrn    _WT_Bounds:word,_WT_XOffset:word,_WT_YOffset:word
                 extrn    _WT_PointTime:word,_WT_SlowTime:word
                 extrn    _WT_YMin:word,_WT_YMax:word
                 extrn    _WT_XSize:word,_WT_YSize:word extrn    oldvector:dword,newvector:dword
                 extrn    WT_TabFunPtr:dword,WT_StackAddr:dword
                 extrn    WT_TabFunDS:word INTRAXPROC       WT_GetVars
                 ENTRYXPROC       _WT_ParseParms
                 INTERXPROC       _WX_IsCool
                 INTERXPROC       _WX_checkmod
                 INTERXPROC       WST_printf packsize         equ      7
InAvail          equ      1          ;bit position for 'input byte available'
flushtime        equ      1000       ;about 1.5 milliseconds
baud             equ      12         ;19.2 = 6, 9600 = 12
stopbits         equ      7          ;tablet = 7, orb = 3 dgroup           group    _data
_data   segment  public   'data'
                 assume   ds:dgroup oldirqcs         dw       ?
oldirqip         dw       ?
oldss            dw       ?
oldsp            dw       ?
oldmask          dw       ?
maskport         dw       ?
mask8259         db       ?
irqnum           dw       4

WT_BaseAddr      dw       3F8H       ;default i/o address of board
intaddr          dw       30H        ;default IRQ of board (IRQ4)
memaddr          dw       ?
limmflag         dw       ?
state_var        dw       ?          ;state machine parameter
```

```
oldds           dw      ?
oldes           dw      ?

copyint         dw      62H         ;the copy data inte
psp             dw      ?           ;segment of PSP powerup_delay   dw      00A0h       ;loop interation co           power-up delay
bytes_recvd     dw      0           ;# of bytes received          packet out_pnt         SPL_POINT   <0,0,0,0>
machine_table   TAB_ENTRY   <start_machine,0,0
WT_Ringer       SPL_POINT   <0,0,0,0> tab_speed       db      0
state_varflg    db      0 tdriverid       db      'WTAB'  ;Table
bannermsg       db      'Freestyle S                            ??.??.02'
                db      0AH,0DH
                db      ' (C) Copr. W
                db      0AH,0DH
                db      'All Rights R
                db      0AH,0DH
                db      'Freestyle is                           ries, Inc.'
                db      0AH,0DH
                db      0AH,0DH
                db      0

_data   ends

CODESEG         WTABLET
                assume  ds:dgroup,es:dgroup rcf:

page
;*******************************************************************************
;*******************************************************************************
;VOID WT_REMOVE()
;REMOVE INTERRUPT FROM VECTOR TABLE LEAVING ORIGINAL VECTOR CODE
ENTRYPROC       _WT_Remove push    ds
                push    es xor     ax,ax
                mov     ds,ax               ;zero page
                mov     ax,dgroup
                mov     es,ax               ;data segment mov     dx,es:maskport      ;8259 mask reg
                in      al,dx
                or      al,es:mask8259      ;mask off interrupt
                out     dx,al
```

```
                mov     dx,es:WT_BaseAddr
                inc     dx                      ;interrupt enable register
                xor     al,al                   ;disable interupts
                out     dx,al mov     bx,es:intaddr           ;point to vector address
                mov     ax,es:oldirqip
                mov     [bx],ax                 ;restore IP
                mov     ax,es:oldirqcs
                mov     [bx+2],ax               ;restore CS ;if (new_vector !=0)
                mov     ax,word ptr cs:newvector        ;point to next guy
                or      ax,word ptr cs:newvector+2
                jz      no_next                         ;no-one ;then new_vector->old_vector = old_vector lds     bx,cs:newvector         ;pointer to new int
                mov     ax,word ptr cs:oldvector
                mov     [bx+8],ax
                mov     ax,word ptr cs:oldvector+2
                mov     [bx+10],ax
                jmp     fix_old ; else int 62h = old_vector no_next:        xor     ax,ax                   ;quick zero
                mov     ds,ax mov     bx,es:copyint
                shl     bx,2 mov     ax,word ptr cs:oldvector
                mov     [bx],ax
                mov     ax,word ptr cs:oldvector+2
                mov     [bx+2],ax ; if (*oldvector == WavesModule )

fix_old:
                lds     bx,cs:oldvector
                cmp     [bx],0AEBH
                jne     rv_done cmp     [bx+2],'MW'
                jne     rv_done mov     ax,word ptr cs:newvector
                mov     [bx+4],ax
                mov     ax,word ptr cs:newvector+2
                mov     [bx+6],ax
rv_done:
                mov     ax,dgroup
                mov     es,ax
                mov     es,es:psp
                mov     ah,49H
                int     21H                     ;release mem for driver
```

```
                pop     es
                pop     ds
                ret

_WT_Remove      endp
page
;****************************************************************************
;****************************************************************************
;VOID WT_ENABLE()
;ENABLE RECEIVED BYTE INTERRUPT IN PARALLEL BOARD
ENTRYPROC       _WT_Enable push    ds mov     ax,dgroup
                mov     ds,ax ; Enable the interrupt controller
                cli
                mov     dx,maskport     ;8259 mask reg
                in      al,dx
                mov     ah,mask8259
                not     ah
                and     al,ah           ;allow IRQ4
                out     dx,al
                sti ;Enable interrupts from the serial controller
                mov     dx,WT_BaseAddr
                inc     dx              ;interrupt enable register
                mov     al,5            ;   enable receive line interupts
                out     dx,al pop     ds
                ret _WT_Enable      endp page
;****************************************************************************
;****************************************************************************
;VOID WT_DISABLE()
;DISABLE REC'D BYTE INTERRUPT FROM PLL BOARD
ENTRYPROC       _WT_Disable push    ds mov     ax,dgroup
                mov     ds,ax ;Don't allow the serial port controller to generate any interrupts
                mov     dx,WT_BaseAddr  ;serial port base address
                inc     dx              ;interrupt enable register
                xor     al,al           ;  all interupts off
                out     dx,al
```

```
                cli
                mov     dx,maskport         ;8259
                in      al,dx
                or      al,mask8259
                out     dx,al
                sti pop     ds
                ret _WT_Disable     endp page
;**************************************************************            **
;****************************************************************            *****
ENTRYPROC       _WT_Init pusha
                push    ds
                mov     ax,dgroup
                mov     ds,ax ;Disable interrupts from the serial port
                mov     dx,WT_BaseAddr
                inc     dx                  ;interrupt enable register
                xor     al,al               ; mask off all interrupts
                out     dx,al
                add     dx,3                ;modem control register
                out     dx,al               ; disable interrupt qualification ;Program serial port, leave interrupts disabled
                ; Set baud rate to 19200
                dec     dx                  ; line control register
                mov     al,80h              ; set DLAB
                out     dx,al
                sub     dx,2                ; divisor latch MSB
                mov     al,00
                out     dx,al
                dec     dx                  ; divisor latch LSB
                mov     al,baud             ; baud rate
                out     dx,al ; Set word length, # stop bits, parity, disable DLAB
                add     dx,3                ; point to line control register
                mov     al,stopbits         ; set word len, stop bits, parity
                out     dx,al ; Set DTR and RTS to provide parasitic power to tablet
                inc     dx                  ;modem control register
                mov     al,0Bh              ; enable DTR & RTS to power tablet
                out     dx,al               ; enable interrupt qualification ; Add delay loop to let the tablet power up and do its stuff. This takes an
; incredible 10 seconds which is insane but what can ya do?
```

; After putting up with this shit once, wipe out the iteration count for the
; outer loop. This prevents us from going throught the delay again.
                mov     ax,powerup_delay
                cmp     ax,0
                je      no_delay
outer_loop:     mov     cx,0AC55h       ;each complete cycle of inner loop last
inner_loop:     loop    inner_loop      ; approximately 0.059 seconds @ 12MHz
                dec     ax
                jnz     outer_loop
                mov     powerup_delay,0 ;remove delay
no_delay:

;Flush any data that may be there, ie: any possible incoming packet
                sub     dx,4            ;point to RX buffer
flushloop2:     in      al,dx
                add     dx,5            ;point to line status register
                mov     cx,flushtime
nobyte2:        in      al,dx           ;read status and see if data is there
                test    al,InAvail
                loopz   nobyte2
                jcxz    flushed2
                sub     dx,5            ;point to RX buffer
                jmp     flushloop2

; Clear any other pending serial port controller interrupts
flushed2:       inc     dx              ; modem status register
                in      al,dx
                sub     dx,4            ; interrupt id register
                in      al,dx ;Set up packet buffer pointer
                mov     bytes_recvd,offset WT_Ringer ;Enable serial port ints
                dec     dx              ; point to interrupt enable register
                mov     al,05H          ; enable data available and
                out     dx,al           ; receive line status interrupts pop     ds
                popa
;               mov     ax,1            ;return true
                ret _WT_Init        endp page
;****************************************************************************
;****************************************************************************
;THE INTERRUPT ROUTINE
WT_Interrupt    proc    near pusha                   ; push all the registers at once
                push    ds
                push    es
```

```
                mov     ax,dgroup
                mov     ds,ax
                mov     es,ax
                mov     oldss,ss
                mov     oldsp,sp
                mov     sp,word ptr WT_StackAddr[0]  ; use user's stack
                mov     ss,word ptr WT_StackAddr[2]
                sti ;Point to current location within packet
                mov     di,bytes_recvd
                cld                         ;set direction to up ;Make sure there is no error
                mov     dx,WT_BaseAddr
                add     dx,02               ;interrupt identification register
                cli
                in      al,dx
                cmp     al,04               ; if not only 'received data availab]
                je      not_hosed           ; then we're hosed, must clear all
                jmp     far ptr hosed       ; possible int sources and resync ;Get data byte
not_hosed:      sub     dx,2                ;RX buffer
                in      al,dx               ;read incoming byte
                mov     ah,al
                mov     dx,maskport         ;shut down tab ints but allow others
                in      al,dx
                mov     oldmask,ax
                or      al,mask8259         ;lockout further tablet ints
                out     dx,al
                mov     al,20H
                out     20H,al              ;send EOI
                sti                         ;ok, we can be disturbed again...

;See if data packet is in sync and in proximity
                mov     al,ah
                cmp     di,offset WT_Ringer ;if 1st byte, then look for phasir
                jne     not_first           ; and prox (phasing = 1, prox = 0)
                and     ah,41h              ;mask off everything else
                cmp     ah,40h
                je      not_first
                jmp     far ptr done        ;jump if not right
not_first:      stosb mov     bx,offset state_machine
                mov     ax,state_var        ; put (possibly) new var into machir
                mov     cs:[bx+20],ax
public state_jmp
state_jmp:      jmp     state_machine ;push state to allow for re-entrant interrupts
reentr:
                push    bx
                push    oldmask
                push    oldsp
```

```
                push    oldss
                push    word ptr WT_StackAddr[0]
                push    word ptr WT_StackAddr[2]

;set up data segment as requested
                mov     ax,cs:WT_TabFunDS
                mov     ds,ax
                mov     es,ax
                call    cs:[WT_TabFunPtr]
                mov     ax,ss:[0]
                push    ax
                pop     ax
                mov     ax,dgroup
                mov     ds,ax
                pop     word ptr WT_StackAddr[2]
                pop     word ptr WT_StackAddr[0]
                pop     oldss
                pop     oldsp
                pop     oldmask
                pop     bx
                ret done            label   far
                mov     bytes_recvd,di    ;save current pointer to buffer
                cli
                mov     dx,maskport       ;8259 mask reg
                mov     ax,oldmask
                out     dx,al
                mov     ss,oldss
                mov     sp,oldsp
                pop     es
                pop     ds
                popa                      ; restore all the registers
                iret ;Clear all possible interrupt sources cuz we got hosed.  Also flush current
; packet cuz data is fried too, will resync on next packet start.
hosed           label   far
                sti
                mov     dx,WT_BaseAddr    ; receiver buffer
                in      al,dx
                add     dx,2              ; interrupt id register
                in      al,dx
                add     dx,3              ; line status register
                in      al,dx
                inc     dx                ; modem status register
                in      al,dx
                mov     di,offset WT_Ringer ;clear pointer to flush this p..
                cli
                mov     al,20H
                out     20H,al            ;send EOI to clear the controller
                jmp     done WT_Interrupt    endp
```

```
ALIGN    16
;;;
;;;   start state machine
;;;
public  state_machine
state_machine:
                db      5000 dup(90h)           ;reserve space for state machine
;;;
;;;   end state machine
;;;

page
;*******************************************************************************
;*******************************************************************************
;BOOL WT_INSTALL()
;INSTALL INTERRUPT PROCEDURE IN INTERRUPT VECTOR TABLE
INTRAPROC       _WT_Install push    ds
                push    es mov     ax,dgroup
                mov     es,ax                   ;data segment installirq:     xor     ax,ax
                mov     ds,ax                   ;zero page
                mov     bx,es:intaddr           ;point to vector address mov     dx,es:maskport          ;8259 mask reg
                in      al,dx
                or      al,es:mask8259          ;mask off interrupt
                out     dx,al ;Check BIOS data area to see if serial port exists
                push    ds                      ;don't trash these
                push    bx
                mov     dx,es:WT_BaseAddr
                mov     ax,0040h                ;point to BIOS data area
                mov     ds,ax
                xor     bx,bx                   ;point to serial port address storage
                mov     cx,0004;                ;check all 4 base addresses to see
CheckLoop:      cmp     dx,[bx]                 ;  if any of them match the one we're
                je      disable                 ;  using - if none do then we're hosed
                add     bx,2
                loop    CheckLoop
                pop     bx                      ;clean stack
                pop     ds
                xor     ax,ax                   ;someone lies, it don't exist so return
                jmp     wtidone                 ;  with ax = false & abort installation ;Disable serial port interrupts
 disable:       mov     dx,es:maskport          ;mask off interrupts at the controller
                in      al,dx
                or      al,es:mask8259
```

```
                out     dx,al
                pop     bx              ;clean stack
                pop     ds ;Install the interrupt vector for our interrupt handler
                mov     ax,[bx]         ;read current IP
                mov     es:oldirqip,ax
                mov     ax,[bx+2]       ;read current CS
                mov     es:oldirqcs,ax
                lea     ax,cs:WT_Interrupt
                mov     [bx],ax         ;install IP
                mov     [bx+2],cs       ;install CS ;Initialize serial port, enable serial pot ints and let the tablet do its thing
                call    _WT_Init ; old_vecotr = (INT 62h)
installcopy:    mov     bx,es:copyint
                mov     bx,es:copyint
                shl     bx,2
                mov     ax,ds:[bx]
                mov     word ptr cs:oldvector,ax
                mov     ax,ds:[bx+2]
                mov     word ptr cs:oldvector+2,ax lea     ax,cs:WT_GetVars
                mov     ds:[bx],ax
                mov     ds:[bx+2],cs lds     bx,oldvector    ;see if prev is chainable
                cmp     [bx],0AEBH
                jne     no_prev
                cmp     [bx+2],'MW'
                jne     no_prev lea     ax,WT_GetVars           ;if so, chain
                mov     [bx+4],ax
                mov     ax,cs
                mov     [bx+6],cs no_prev:        mov     ax,1            ;return TRUE wtidone:        pop     es
                pop     ds ret     ;wtidone used to be here _WT_Install     endp page
;********************************************************************************
;********************************************************************************
INTERPROC       _main stackinit:      cli
                mov     ax,dgroup
```

```
                mov     ds,ax
                add     word ptr WT_StackAddr[0],100    ;use internal stack
                mov     sp,word ptr WT_StackAddr[0]
                mov     ss,word ptr WT_StackAddr[2]
                sti
                mov     psp,es                  ;save the PSP addr call    _WX_IsCool
                test    ax,ax
                jne     getparms                ;Yes, get parms push    offset dgroup : bannermsg   ;Print Banner
                call    WST_printf
                push    ds
                push    cs
                pop     ds
                push    offset cs : no_install  ;Print no_install
                call    WST_printf
                jmp     error
public getparms
getparms:
                push    offset dgroup:state_var
                push    offset cs:path
                push    offset dgroup:limmflag
                push    offset dgroup:irqnum
                push    offset dgroup:WT_BaseAddr
                push    offset dgroup:memaddr
                push    offset dgroup:copyint
                call    _WT_ParseParms
                add     sp,14
                push    copyint                 ;Check to see that
                push    offset dgroup :tdriverid
                                                ;we're not already installed public got_parms
got_parms:
                call    _wx_checkmod
                cmp     ax,0FFFFH
                jne     not_in push    offset dgroup : bannermsg ;Print Banner
                call    WST_printf
                push    ds
                push    cs
                pop     ds
                push    offset cs : isinmsg     ;tablet installed already
                call    WST_printf              ;print msg and then exit
                jmp     error ;set up the state variables
not_in:         mov     word ptr _WT_Bounds[0],0
                mov     word ptr _WT_Bounds[2],0
                mov     word ptr _WT_Bounds[4],8999
                mov     word ptr _WT_Bounds[6],11999
                mov     _WT_XOffset,0
                mov     _WT_YOffset,0
```

```
                mov     _WT_XSize,9000
                mov     _WT_YSize,12000
                mov     _WT_YMin,0
                mov     _WT_YMax,12000 mov     _WT_PointTime,5
                mov     _WT_SlowTime,30 mov     cx,irqnum
                mov     ax,1
                shl     ax,cl           ;shift mask bit into right place
                test    al,al           ;see if it is the high order IRQs
                jz      upper8s
                add     cx,8
                mov     maskport,21H
                mov     mask8259,al
                jmp     short setintaddr
upper8s:        add     cx,70H
                mov     maskport,0A1H
                mov     mask8259,ah
setintaddr:     shl     cx,2
                mov     intaddr,cx      ;addr of vector in table ;;;
;;;     load machine using DOS fnt 4B03H (load overlay)
;;;     es:bx - segment:offset of param_blk
;;;     ds:dx - segment:offset of program specification
;;;
;;;     if carry set, then error condition exists
;;;

mov     ax,cs
                mov     dx,cs
                shl     ax,4
                shr     dx,12
                add     ax,offset state_machine
                adc     dx,0
                shl     dx,12
                shr     ax,4
                add     ax,dx
                mov     cs:param_blk[0],ax
                mov     cs:param_blk[2],ax push    es              ;set up es and ds
                push    ds
                mov     ax,cs
                mov     ds,ax
                mov     es,ax mov     bx,offset cs:param_blk
                mov     dx,offset cs:path
                mov     ax,4B03H
                int     21H
                pop     ds              ;restore es and ds
                pop     es
                jnc     setup_machine
```

```
                push    ds
                push    cs
                pop     ds
                push    offset cs:no_load
                call    WST_Printf
                jmp     error param_blk       dw      2 dup(0)            ;put params here and save 68 bytes!
path            db      64 dup(0)

;;;
;;;     initialize the state machine's data area
;;;

setup_machine:

mov     bx,offset state_machine
                mov     cx,cs:[bx+4]               ;machine length
                mov     machine_table.state_len,cx
                mov     cx,cs:[bx+6]               ;param lo rng
                mov     machine_table.var_rngl,cx
                mov     cx,cs:[bx+8]               ;param hi rng
                mov     machine_table.var_rngh,cx mov     cs:[bx+10],offset reentr
                mov     cs:[bx+12],offset done
                mov     cs:[bx+14],offset hosed mov     cx,offset WT_Ringer
                mov     cs:[bx+16],cx
                mov     cx,offset out_pnt
                mov     cs:[bx+18],cx mov     cx,state_var
                mov     cs:[bx+20],cx
                mov     cx,offset tab_speed
                mov     cs:[bx+22],cx public st_parm_chk
st_parm_chk:
                mov     ax,machine_table.var_rngl
                cmp     machine_table.var_rngh,ax
                jne     chk_rngl cmp     state_varflg,0
                je      do_Install push    ds
                push    cs
                pop     ds
                push    offset cs:sv_ignored    ;state variable ignored messag
                call    WST_printf
                pop     ds
                pop     ds
                jmp     do_Install
```

```
public chk_rngl
chk_rngl:
                cmp         state_varflg,0
                jne         keep_do_rngl push        ds
                push        cs
                pop         ds
                push        offset cs:sv_required   ;sm parm required but not given
                call        WST_Printf
                jmp         error keep_do_rngl:
                mov         cx,machine_table.var_rngl
                cmp         cx,state_var
                jle         chk_rngh
                push        ds
                push        cs
                pop         ds
                push        offset cs:sv_toolow     ;state variable too low
                call        WST_printf
                pop         ds
                pop         ds
                mov         bx,offset state_machine ;change val in state_var
                mov         cx,machine_table.var_rngl
                mov         cs:[bx+20],cx           ;default to lower limit
                jmp         do_Install public chk_rngh
chk_rngh:
                mov         cx,machine_table.var_rngh
                cmp         cx,state_var
                jge         do_Install
                push        ds
                push        cs
                pop         ds
                push        offset cs:sv_toohi      ;state variable too hi
                call        WST_printf
                pop         ds
                pop         ds
                mov         bx,offset state_machine ;change val in state_var
                mov         cx,machine_table.var_rngh
                mov         cs:[bx+20],cx           ;default to upper limit
                jmp         do_Install do_Install:
                call        _WT_Install             ;install vectors
                test        ax,ax
                jnz         releaseenv
                push        offset dgroup : bannermsg   ;Print Banner
                call        WST_printf
                push        ds
                push        cs
                pop         ds
                push        offset cs:install_fail  ;tablet installation failed
                call        WST_printf              ;print msg and then exit
                jmp         error
```

```
releaseenv:           ;ES assumed to hold PSP
            push    es                  ;we need it later
            mov     es,es:[2CH]         ;get pointer to environment
            mov     ah,49H
            int     21H                 ;release env block pop     bx                  ;BX = PSP
            lea     dx,cs:_WT_Install
            sub     dx,5000             ;-5000 for state mc buffer
            add     dx,machine_table.state_len   ;+ length of state mc
            shr     dx,4
            inc     dx                  ;DX = paragraph offset of _WT_Install
            mov     ax,cs
            add     dx,ax               ;DX = paragraph of _WT_Install
            sub     dx,bx               ;DX = size in paragraphs
            mov     ax,3103H
            int     21H                 ;TSR error:      mov     ax,4C00H
            int     21H                 ;normal exit no_install     db    'Program must be executed from Freestyle.'
               db    0AH,0DH
               db    0AH,0DH
               db    0
isinmsg        db    'Tablet driver already installed.'
               db    0AH,0DH
               db    0AH,0DH
               db    0
install_fail   db    'Tablet driver installation failed. The specified '
               db    'serial port does not exist.'
               db    0AH,0DH
               db    0AH,0DH
               db    0
sv_ignored     db    'A variable to the state machine was supplied but '
               db    'ignored. '
               db    0AH,0DH
               db    0AH,0DH
               db    0
sv_toolow      db    'The variable supplied to the state machine is '
               db    'below the acceptable limit.'
               db    0AH,0DH
               db    'The lowest acceptable value will be used.'
               db    0AH,0DH
               db    0
sv_toohi       db    'The variable supplied to the state machine is '
               db    'above the acceptable limit.'
               db    0AH,0DH
               db    'The highest acceptable value will be used.'
               db    0AH,0DH
               db    0
sv_required    db    'This state machine needs a parameter.'
               db    0AH,0DH
               db    'Make sure that /p### is supplied on the command line.
               db    0AH,0DH
               db    '(### is a number from 0 to 100)'
               db    0AH,0DH
               db    0
```

```
no_load          db       'Due to circumstances beyond our control,'
                 db       0AH,0DH
                 db       'we are unable to load the state machine.'
                 db       0AH,0DH
                 db       'Be sure to include the ENTIRE path for the file.'
                 db       0AH,0DH
                 db       0

_main            endp

CODEEND          WTABLET
                 end      _main include \bs\model.mac
```

APPENDIX B

```
SPL_POINT        STRUC
spl_header       db       0
x_coord          dw       0
y_coord          dw       0
unused           db       0
SPL_POINT        ENDS

.286

CODESEG WTABLET

;;;
;;;      STATE MACHINE SM4:      /p [1-99]
;;;                              where [1-99] is the percentage
;;;                              of the distance between 2 points
;;;                              to be traversed
;;;

sm5:
                 db       0e9H              ;jump near
state            dw       (state1 - sm5 - 3)

;;;
;;; IMPORTANT NOTE!!! the following block must appear in every
;;;                   state machine in exactly the same position
;;;                   with exactly the same number and type of
;;;                   definitions.  The offsets may be changed
;;;                   in the 1st entry and the values of 'parmlo'
;;;                   and 'parmhi' will vary, but the structure
;;;                   must be consistent.  However, the names may
;;;                   be changed to protect the innocent.
;;;

ALIGN    4 len              dw       (offset sm5_end - offset sm5)
parm_lo          dw       1                 ;low range for param
parm_hi          dw       99                ;hi range for param
```

```
reentr          dw      ?               ;reentr entry point
done            dw      ?               ;done entry point
hosed           dw      ?               ;hosed entry point
sin             dw      ?               ;WT_Ringer offset
sout            dw      ?               ;out_pnt offset
statevar        dw      ?               ;value of state mc parm
speed           dw      ?               ;tab_speed offset

;;;
;;; END BLOCK
;;;

last1           SPL_POINT       <0,0,0,0>       ;buffer for prev point
state1:
                mov     ax,cs:[bx+sin]
                add     ax,5
                cmp     di,ax                   ;whole packet? do it
                je      roll_buffer
                jmp     cs:[bx+done]

roll_buffer:
                mov     si,cs:[bx+sin]          ;offset WT_Ringer
                mov     di,cs:[bx+sout]         ;offset out_pnt lodsb
                stosb lodsw                           ;take 2 bytes of X and combine to
                and     ax,3F3Fh                ;  get X-coord (only uses 6 low
                shl     al,2                    ;  order bits of each byte)
                shr     ax,2
                stosw lodsw                           ;take 2 bytes of Y and combine to
                and     ax,3F3Fh                ;  get Y-coord (only uses 6 low
                shl     al,2                    ;  order bits of each byte)
                shr     ax,2
                stosw mov     al,cs:[bx+last1]        ;last1.spl_header
                cmp     al,0
                je      alldone x:
                mov     si,cs:[bx+sout]
                mov     di,si
                lodsb
                stosb lodsw                           ;out_pnt.x_coord
                sub     ax,cs:[bx+last1].x_coord
                mov     cx,[bx+statevar]
                imul    cx
                mov     cx,100
                idiv    cx
                add     ax,cs:[bx+last1].x_coord
                stosw
```

```
y:
        lodsw
        sub     ax,cs:[bx+last1].y_coord
        mov     cx,cs:[bx+statevar]
        imul    cx
        mov     cx,100
        idiv    cx
        add     ax,cs:[bx+last1].y_coord
        stosw alldone:
        call    cs:[bx+reentr]

mov     si,cs:[bx+sout]
        mov     ax,bx                       ;make di point to last1
        add     ax,24                       ;
        mov     di,ax                       ;
        push    cs
        pop     es
        movsb                               ;copy out_pnt into sm5_last1
        movsw
        movsw mov     di,cs:[bx+sin]

jmp     cs:[bx+done]
sm5_end:

CODEEND WTABLET end
```

What is claimed is:

1. A data processing system, comprising:

a. a memory storing instructions and data including an application program and a device driver code module, and b. a processor responsive to the instructions and data stored in memory for executing the application program and for executing the device driver code module to transform data signals from an external device to a form for input to the executing application program, the device driver code module comprising:

a device driver code portion comprising instructions and data used by the processor for receiving data signals from the external device and for sending transformed data signals to the executing application program, and a transform code portion loaded into memory with the device driver code portion and comprising instructions and data used by the processor for transforming the data signals received by the device driver code portion from the external device into the transformed data signals for sending to the executing application program by the device driver code portion in accordance with a specific transformation procedure, each transform code portion comprising:

(1) an algorithm code portion comprising instructions for defining a finite state machine used by the processor for executing the transformation procedure prescribed for the selected transform code portion, (2) a gateway code portion including instructions and data used by the processor for controlling entry into the finite state machine of the algorithm code portion, and (3) a data block portion for storing data containing information used by the processor for executing the selected transform code portion, including data indicating the address in memory of a first buffer area for storing the first data structure data signals received from the external device, and data indicating the address in memory of a second buffer area for storing the second data structure data signals generated by the selected transform algorithm operating on the first data structure data signals stored in the first buffer area, wherein the processor selects the transform code portion from a plurality of prescribed transform code portions each corresponding to a specific transformation procedure, and loads the selected transform code portion into the memory with the device driver code portion to provide the device driver code module.

2. The data processing system of claim 1 wherein the device driver code portion comprises:

a permanent code space portion comprising instructions used by the processor for executing the device driver, and a transform loading area for receiving the selected prescribed transform code portion to be loaded into memory with the device driver code portion.

3. The data processing system of claim 2 wherein the device driver code portion further comprises a temporary installation code area comprising instructions used by the processor for initializing the device driver, loading the selected transform code portion into the transform loading area, and initializing the external device.

4. The data processing system of claim 1 wherein at least one of the prescribed transformation procedures is a data filtering type.

5. The data processing system of claim 1 wherein at least one of the prescribed transformation procedures is an X percent of the way there type of algorithm, and the X percent is a variable having a predetermined magnitude from a range of magnitudes.

6. The data processing system of claim 5 wherein the predetermined magnitude is selected by a user.

7. The data processing system of claim 1 wherein at least one of the prescribed transformation procedures is a four point averaging type of algorithm.

8. The data processing system of claim 1 wherein at least one of the prescribed transformation procedures is a data enhancing type of algorithm which generates at least one new data point in addition to those produced by the external device.

9. The invention as recited in claim 8 wherein the data enhancing type of prescribed transformation procedure is a pseudo B-Spine type of algorithm.

10. A data processing system, comprising:

a. a memory storing instructions and data including an application program and a device driver code module, and b. a processor responsive to the instructions and data stored in memory for executing the application program and for executing the device driver code module to transform data signals from an external device to a form for input to the executing application program, the device driver code module comprising:

a device driver code portion comprising instructions and data used by the processor for receiving data signals from the external device and for sending transformed data signals to the executing application program, the device driver code portion having a permanent code space portion comprising instructions used by the processor for executing the device driver, and a transform code portion loaded into memory with the device driver code portion and comprising instructions and data used by the processor for transforming the data signals received by the device driver code portion from the external device into the transformed data signals for sending to the executing application program by the device driver code portion in accordance with a specific transformation procedure, the transform code portion comprising:

(1) an algorithm code portion comprising instructions for defining a finite state machine used by the processor for executing the transformation procedure prescribed for the selected transform code portion, (2) a gate way code portion including instructions and data used by the processor for controlling entry into the finite state machine of the algorithm code portion, and (3) a data block portion for storing data containing information used by the processor for executing the selected transform code portion including data indicating the address in memory of a first buffer area for storing the first data structure data signals received from the external device, and data indicating the address in memory of a second buffer area for storing the second data structure data generated by the selected transform algorithm operating on the first data structure data signals stored in the first buffer area, and the device driver code portion further comprises a transform loading area for receiving the transform code portion to be loaded into memory with the device driver code portion, and a temporary installation code area comprising instructions used by the processor for initializing the device driver, loading the transform code portion into the transform loading area, and initializing the external device, wherein the processor selects the transform code from a plurality of prescribed transform code portions each corresponding to a specific transformation procedure, and the processor loads the selected transform code portion into the transform loading area of the device driver code portion to provide the device driver code module.

11. The data processing system of claim 10 wherein at least one of the prescribed transformation procedures is a data filtering type.

12. The data processing system of claim 10 wherein at least one of the prescribed transformation procedures is an X percent of the way there type of algorithm, and the X percent is a variable having a predetermined magnitude from a range of magnitudes.

13. The data processing system of claim 12 wherein the predetermined magnitude is selected by a user.

14. The data processing system of claim 10 wherein at least one of the prescribed transformation procedures is a four point averaging type of algorithm.

15. The data processing system of claim 10 wherein at least one of the prescribed transformation procedures is a data enhancing type of algorithm which generates at least one new data point in addition to those produced by the external device.

16. The data processing system of claim 10 wherein the data enhancing type of prescribed transformation procedure is a pseudo B-Spine type of algorithm.

17. A method for processing data, comprising the steps of:

a. storing instructions and data including an application program and a device driver code module in a memory, and b. providing a processor responsive to the instructions and data stored in memory for executing the application program and for loading in memory and executing the device driver code module to transform data signals from an external device to a form for input to the executing application program, loading the device driver code module in memory comprising the steps of:

loading a device driver code portion in memory comprising instructions and data used by the processor for receiving data signals from the external device and for sending transformed data signals to the executing application program, selecting a transform code portion from a plurality of prescribed transform code portions each corresponding to a specific transformation procedure and comprising instructions and data used by the processor for transforming the data signals into the transformed data signals for sending to the executing application program by the device driver code portion, and loading the selected transform code portion into memory with the device driver code portion, including the steps of:

(1) loading an algorithm code portion comprising instructions for defining a finite state machine used by the processor for executing the transformation procedure prescribed for the selected transform code portion, (2) loading a gateway code portion including instructions and data used by the processor for controlling entry into the finite state machine of the algorithm code portion, and (3) loading a data block portion for storing data containing information used by the processor for executing the selected transform code portion, including loading data indicating the address in memory of a first buffer area reserved in the memory for storing data signals received from the external device, and loading data indicating the address in memory of a second buffer area reserved in the memory for storing the transformed data signals generated by the selected transform algorithm operating on the data signals stored in the first buffer area.

18. The data processing method of claim 17 wherein loading the device driver code portion in memory comprises:

loading a permanent code space portion in memory comprising instructions used by the processor for executing the device driver, and reserving a transform loading area in memory for receiving the selected prescribed transform code portion to be loaded into memory with the device driver code portion.

19. The data processing method of claim 18 wherein loading the device driver code module further comprises:

reserving a temporary installation code area in memory for storing instructions used by the processor for initializing the device driver, loading the selected transform code portion into the transform loading area, and initializing the external device.

20. The data processing method of claim 17 wherein at least one of the prescribed transformation procedures is a data filtering type.

21. The data processing method of claim 17 wherein at least one of the prescribed transformation procedures is an X percent of the way there type of algorithm, and the X percent is a variable having a predetermined magnitude from a range of magnitudes.

22. The data processing method of claim 21 wherein the predetermined magnitude is selected by a user.

23. The data processing method of claim 17 wherein at least one of the prescribed transformation procedures is a four point averaging type of algorithm.

24. The data processing method of claim 17 wherein at least one of the prescribed transformation procedures is a data enhancing type of algorithm which generates at least one new data point in addition to those produced by the external device.

25. The data processing method of claim 17 wherein the data enhancing type of prescribed transformation procedure is a pseudo B-Spline type of algorithm.

* * * * *